United States Patent
Bramson et al.

(10) Patent No.: US 7,302,119 B1
(45) Date of Patent: Nov. 27, 2007

(54) POLYMER PHASE MODULATOR

(75) Inventors: Michael D Bramson, Ridgecrest, CA (US); Paul R. Ashley, Toney, AL (US); Geoffrey A. Lindsay, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 255 days.

(21) Appl. No.: 11/288,050

(22) Filed: Nov. 23, 2005

Related U.S. Application Data

(63) Continuation-in-part of application No. 11/208,119, filed on Aug. 16, 2005, now Pat. No. 7,228,022.

(51) Int. Cl.
*G02F 1/35* (2006.01)
*G02B 6/10* (2006.01)

(52) U.S. Cl. .................. 385/3; 385/14; 385/27; 385/40; 385/49; 385/122; 385/129; 385/130; 385/131; 385/132; 385/141; 385/142; 385/143; 385/144; 385/145; 356/460

(58) Field of Classification Search .......... 385/2–3, 385/141–145, 129–132, 12, 27, 39–40, 122, 385/14; 356/73, 460
See application file for complete search history.

(56) References Cited

U.S. PATENT DOCUMENTS

| | | | | |
|---|---|---|---|---|
| 5,061,028 A | * | 10/1991 | Khanarian et al. | 385/132 |
| 5,778,112 A | * | 7/1998 | Hwang et al. | 385/2 |
| 5,943,464 A | * | 8/1999 | Khodja | 385/122 |
| 6,853,758 B2 | * | 2/2005 | Ridgway et al. | 385/2 |

* cited by examiner

*Primary Examiner*—Frank G. Font
*Assistant Examiner*—Michael P. Mooney
(74) *Attorney, Agent, or Firm*—Charlene A. Haley; David S. Kalmbaugh

(57) ABSTRACT

An optical phase modulator comprising a plurality of non-polarizing waveguides having a layered stack including a core between at least one layer of cladding material, wherein the core is constructed of electro-optic material(s), wherein the layers of cladding materials having lower indices of refraction than the core for guided mode, wherein the layer of cladding material having higher indices of refraction than the core for non-guided mode, a substrate dimensioned and configured to integrate a plurality of optical components, wherein the optical components include a plurality of non-polarizing waveguide(s), a waveguide having a non-polarizing non-modulating region and a non-polarizing modulating region, coupler/splitter(s), electrode(s), a waveguide configuration including a first non-polarizing waveguide, a second polarizing waveguide and a third waveguide, and at least two optical fiber pigtails where one is coupled to a second and third waveguide.

17 Claims, 7 Drawing Sheets

POLYMER PHASE MODULATOR

CROSS-REFERENCE TO RELATED APPLICATIONS

This is a continuation-in-part application, claiming the benefit of, parent application Ser. No. 11/208,119 filed on Aug. 16, 2005 now U.S. Pat. No. 7,228,022 which is with other parent application Ser. No. 11/208,120 filed on Aug. 16, 2005 in which claim of benefit is also made, whereby the entire disclosures are hereby incorporated by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention relates to Inertial Measurement Units (IMU) employing interferometric fiber optic gyroscopes (IFOG) and other sensors and communication systems.

BACKGROUND OF THE INVENTION

The Interferometric Fiber Optic Gyroscope (IFOG) was first developed at Stanford University in 1981. The Stanford IFOG is more fully described in the Stanford Report No. 3586, June 1983 by Ralph Alan Bergh G. L., of Stanford, Calif. The operation of this basic IFOG follows. A light source passes light through the interferometer optics and is split into two beams that propagate in opposite directions around the fiber optic coil. The light is recombined and the resultant intensity at the detector is proportional to the phase difference between the two beams. This phase difference is in turn proportional to an input rotation rate.

The Stanford IFOG research demonstrated the suitability of the IFOG as a rotation sensor for navigation applications. If mass production techniques could be devised for fabricating the sensor, electronic methods employed for error compensation as well as obtaining a linear digital output, and packaging devised for overcoming environmental sensitivities, the gyro could be made practical. Technology developed in the 1980's addressed these issues.

To make the sensor more producible, environmentally stable, and better suited to digital electronics, a Lithium Niobate (LiNbO$_3$) crystal integrated optical chip with waveguides, couplers, and phase modulators was developed. Optical waveguides are devices that guide light waves along a path typically defined by a transparent core and a transparent cladding surrounding the core, with the cladding material generally having a lower index of refraction than the core material. The chip is employed between the input fiber optic coupler and the fiber optic coil of the gyroscope. The highly degenerate mode rejecting true single mode waveguide operation (highly polarizing waveguide), high modal purity, and low polarization cross talk performance of the crystal waveguides enabled navigation application gyro performance. The high modulation bandwidth and linearity possible with the LiNbO$_3$ chip enabled the use of electronic means for error compensation and generating a linear digital output. Additionally, the component plainarization afforded by integrated optic fabrication eliminates some of the inter-component misalignments which degrade performance. Finally, using the integrated optics chip reduces the parts count, the volume, and the touch labor required to manufacture the gyroscope.

Although the LiNbO$_3$ chip provides a level of integration, the gyro remains as an assembly of discretely packaged components wherein each gyro component has attached fiber optics used to communicate with other components. Further, the redundant packaging adds bulk, cost, and electrical complication from shielding and grounding considerations.

BRIEF DESCRIPTION OF THE DRAWING

It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS

Most conventional phase modulators are made of inorganic crystalline materials, including lithium niobate. However, the modulator described in this invention is constructed of polymer materials. The invention relates to a polymeric transverse magnetic (TM) non-degenerate single optical mode modulator module with a lower cladding graft. To form a hybrid waveguide, at least two types of lower cladding material must be grafted together. Two lower cladding materials are combined along the length of one waveguide by tapering the thickness to zero at the terminus of the first waveguide material and overlapping the tapered region with a corresponding tapered region of the second material. For low optical loss the tapered region consisting of the overlapping of the two materials is much longer than the thickness of the cladding and core. The thickness of each of the lower cladding materials in the regions outside of the overlap or graft may be different with the combined thickness of the overlapping region gradually changing along the length from the thickness of the first cladding material to the second material. One use for the modulators 40 include fiber optic gyroscopes. A non-degenerate single mode transceiver module couples polarized light into the modulator module and detects polarized light coming from the modulator module.

Figure 1:
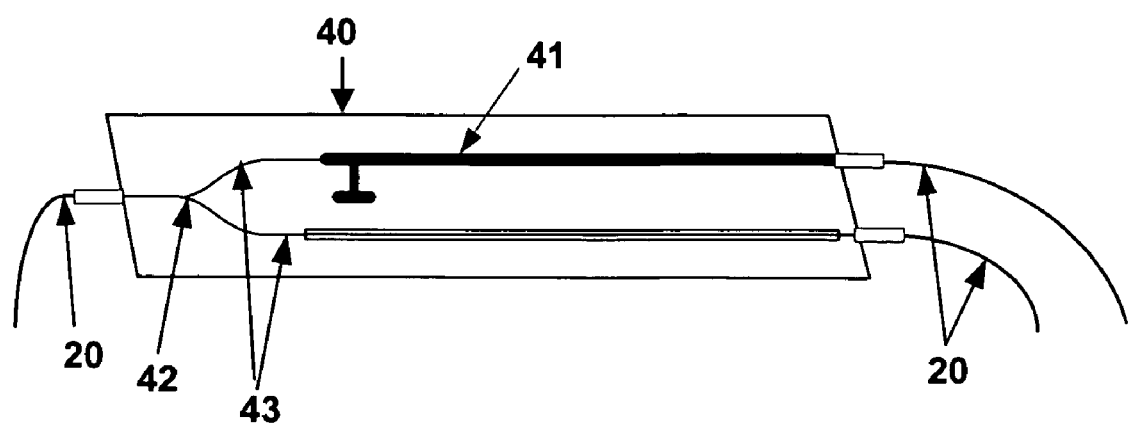
FIG. 1 is a perspective view of an embodiment of a polymer phase modulator, according to embodiments of the invention.

The use of polymer material has a number of advantages over the inorganic materials including low cost, processability, and ability to integrate with optical components. In embodiments, the polarizing (TM) waveguides are constructed of an electro-optic core material in between two polymer cladding materials that have lower indices of refraction for the guided mode. This three-layer stack is coupled to a silicon substrate. The waveguide pattern includes a coupler 42 that splits the light almost equally along two symmetric channels 43 (see FIG. 1). Gold electrodes 41 are also fabricated on one or both arms depending on the type of configuration. The light is coupled into and out of the modulator via PM fiber 20 integrated with the waveguides.

The electro-optic properties are induced in the core material by electrically poling it at a temperature near its glass transition temperature and cooling the material before removing the electric poling field. After the poling process, the index of refraction of the portion of the core materials between the electrodes can be altered by applying an external electric field, which in turn changes the phase of the light propagating through the modulated region of the waveguide. It is possible to modulate either one of the channels or both channels such that a phase shift is introduced between the two outputs of the modulator. The voltage needed to induce a phase change of $\pi$ is known as the half-wave drive voltage ($V_\pi$). In designing the modulator, one of the major objectives is to obtain a low $V_\pi$. In addition, a higher modulation depth and a lower propagation loss are also important to enhance its performance.

The invention relates to an optical phase modulator comprising, a plurality of non-polarizing waveguides having a layered stack including a core between at least one layer of cladding material, wherein the core is constructed of electro-optic material(s), wherein the layers of cladding materials having lower indices of refraction than the core for guided mode, wherein the layer of cladding material having higher indices of refraction than the core for non-guided mode, a plurality of ports coupled to the waveguides, at least one electrode coupled to at least one the waveguide including a modulating non-polarizing region, means for applying an external electrical field to each electrode, a light that propagates into each waveguide, at least one coupler/splitter for coupling and splitting the light into a plurality of waveguides, a substrate dimensioned and configured to integrate a plurality of optical components, wherein the optical components include a plurality of non-polarizing waveguide(s), a waveguide having a non-polarizing non-modulating region and a non-polarizing modulating region, coupler/splitter(s), and electrode(s), a waveguide configuration including a first non-polarizing waveguide, wherein the first waveguide is coupled to the coupler/splitter, wherein the coupler/splitter including a plurality of splitter ports, wherein each splitter port is coupled to a second polarizing waveguide and third non-polarizing waveguide, wherein at least one of the second waveguide or third waveguide includes a non-polarizing modulating region, wherein the second waveguide and the third waveguide each include a port, and at least two optical fiber pigtails, wherein each end of the second and third waveguides are coupled to the optical fiber pigtails.

The term "polarizing" refers to the waveguide(s) being non-degenerate single mode waveguides. The term "non-polarizing" refers to the waveguide(s) being single mode waveguides. In embodiments of the invention, the cladding materials utilized are constructed of a plurality of polymer materials. In embodiments, the invention includes waveguides that are constructed of a stack including at least a three layer stack having a core between at least two polymer cladding layers. The cladding materials are constructed of materials comprising at least one of NOA-71 and NOA-61.

In embodiments, the electrode(s) is constructed of semiconductive materials. In other embodiments, the electrode is constructed of conductive materials including at least one of metals, metal alloys, sulfides, polymers, and oxides. The means for applying an external electrical field to the electrodes include at least one of a voltage- or electric signal-generating device. The substrate is made of any material that are effective to the utilities of the invention. In embodiments, the substrate is constructed of silicon and/or silicon nitride.

In embodiments, the modulator includes a polymeric transverse magnetic (TM) non-degenerate single optical mode region for use in a fiber optic gyroscope. In these (TM) embodiments, the layers of cladding materials include a lower cladding and an upper cladding, wherein the lower cladding, the upper cladding and the core each having an ordinary index of refraction and an extraordinary index of refraction, wherein the lower cladding having an extraordinary index of refraction being $ne_L$ and an ordinary index of refraction being $no_L$, wherein the core having an extraordinary index of refraction being $ne_C$ and an ordinary index of refraction being $no_C$, wherein the upper cladding having an extraordinary index of refraction being $ne_U$ and an ordinary index of refraction being $no_U$, wherein the ordinary indices of refraction include $no_U < no_C < no_L$ and the extraordinary indices of refraction include $ne_L < ne_C > ne_U$.

In embodiments, the modulator includes a polymeric transverse electric (TE) non-degenerate single optical mode region for use in a fiber optic gyroscope. In these (TE) embodiments, the layers of cladding materials include a lower cladding and an upper cladding, wherein the lower cladding, the upper cladding, and the core each having an ordinary index of refraction and an extraordinary index of refraction, wherein the lower cladding having an extraordinary index of refraction being $ne_L$ and an ordinary index of refraction being $no_L$, wherein the core having an extraordinary index of refraction being $ne_C$ and an ordinary index of refraction being $no_C$, wherein the upper cladding having an extraordinary index of refraction being $ne_U$ and an ordinary index of refraction being $no_U$, wherein the ordinary indices of refraction include $no_U < no_C > no_L$ and the extraordinary indices of refraction include $ne_L > ne_C > ne_U$.

The modulating region of the waveguide includes a lower cladding layer being constructed of substantially non-birefringent materials. The non-modulating region of the waveguide includes a lower cladding layer being constructed of birefringent materials. In embodiments, at least one polarizing non-modulating waveguide is dimensioned and configured shorter in length than other waveguides. In other embodiments, the waveguide is shorter and the waveguide is terminated inside from an edge of the substrate. Embodiments of the invention include the waveguides being configured in a co-linear construction. The core is constructed of materials comprising at least one of electro-optic polymer. In embodiments of the invention, the second and third waveguides further include optical fiber pigtails and the optical pigtails are coupled to the waveguides. When polymers are made to construct the core they include polymers with covalently attached chromophores. In embodiments, the light includes a continuous wavelength distribution that propagates into the waveguide.

A typical configuration of the embodiments of the modulator includes: the light propagated into the waveguides and then into the splitter/coupler(s). The light is then split and propagated into the waveguides either equally or unequally. After the light splits into at least two propagating lights, one light propagates through the modulated region of the waveguide and as an external electrical field is applied to the electrode, the phase of the light changes in the modulated region to create a phase shift between the outputs of the modulator. The "means for applying an electrical field" generates a voltage to induce a phase change having a low $V_\pi$.

The lower cladding material must be resistant to the solvent used for applying the core layer. Suitable lower cladding materials for the non-polarizing waveguides and for the TE polarizing waveguide embodiment are crosslinkable polymers having low birefringence, such as polyimides [as, for example, published in U.S. Pat. No. 6,389,215] and crosslinkable resins, such as NOA 71 and NOA 61 from Norland, Inc. For the TM polarizing waveguide embodiment, suitable lower cladding are rigid polymers that exhibit a large degree of negative birefringence, especially polyimides such as Pyrilin 5878, and polyimides incorporating biphenyl-containing monomer units [see for example: F. Li, et al, *Polymer* 1997, vol. 38 (no. 13), pp. 3223-3227] that can be spin cast as the poly(amic acid) to form non-crystalline polyimide films [see for example: A. J. Guenthner, G. A. Lindsay, K. R. Davis, L. Steinmetz, and J. M. Pentony, *Proc. of SPIE,* 2003, vol. 5212, p. 100]. Care must be taken to avoid any crystallinity in these lower cladding films that would increase the optical loss due to light scattering.

Many examples of electro-optic polymer materials are in the literature, for example see G. A. Lindsay and K. D. Singer, *Polymers for Second Order Nonlinear Optics*, Am. Chem. Soc. Symposium Series 601, 1995. In TE polarized waveguide embodiments, the birefringent core is constructed of electro-optic (EO) polymer material(s) that contain rigid para-linked aromatic groups and similar structures that lead to negative birefringence upon spin casting the film, and in which the negative birefringence can be further enhanced by electric field poling with coplanar electrodes. In TM waveguide embodiments, the core is constructed of electro-optic polymer material(s) that are essentially non-birefringent, that have positive birefringence, or that become so during the electric-field poling process. Examples of guest-host EO core materials can be found in these publications, for example: U.S. Pat. No. 6,348,992 B1; L. R. Dalton, et al., *Journal of Materials Chemistry* 1999, vol. 9, pp. 1905-1920; S. Ermer, et al., *Proceedings of the SPIE* 2000, vol. 3949, pp. 148-155; M. He, et al., *Chemistry of Materials* 2002, vol. 14, pp 46694675; and M. C. Davis, A. P. Chafin, R. A. Hollins, L. C. Baldwin, E. D. Erickson, P. Zan-as, E. C. Drury, *Synthetic Communications* 2004, vol. 34(no. 18), pp. 3419-3429. Examples wherein the chromophore is attached to the polymer can be found in these publications: S. Liu, T. Sassa, H. Ma, A. Jen, and L. R. Dalton, *Proceedings of SPIE* 2002, Vol. 4798 pp. 133-141; H.-T. Man and H. N. Yoon, *Applied Physics Letters* 1998, vol. 72 (no. 5), pp. 540-542; and B.-J. Jeon, et al., *Journal of Materials Chemistry* 2002, vol. 12, pp. 546-552. The upper cladding is constructed of material(s) including at least one of, but not limited to, Norland NOA-61, NOA-71 and similar solventless epoxy polymer resins that can be UV-cured.

In patent application Ser. No. 11/208,119, the invention relates to an optical transceiver including an optical bench comprising of a waveguide on a substrate. The transceiver includes a light source coupled to the optical bench and a system of transceiver module waveguides that are incorporated into the top layer of the optical bench. The waveguides are patterned into the optical bench utilizing a combination of specific optical waveguide polymer layers.

The transceiver includes a waveguide coupler having at least three ports: an output port, a detector port and a light source port. The coupler is incorporated into the top layer of the optical bench and the coupler is patterned into the optical bench utilizing a combination of specific optical waveguide polymers. The output port is coupled to the waveguide coupler and a fiber. The fiber propagates an optical signal into the output port, into the waveguide coupler, through the detector port, and into a detector. The detector is coupled to the optical bench where the detector converts optical signal into electrical signal.

In other embodiments, the transceiver includes a pre-amplifier and the detector is coupled to the system of transceiver module waveguides and pre-amplifier wherein the light from the light source includes a continuous wavelength distribution. In other embodiments, the transceiver further includes a thermal management system having a thermistor and a thermoelectric cooler (TEC). The thermistor is coupled to the thermoelectric cooler and the thermoelectric cooler is coupled to the optical bench for thermal management of the transceiver. In further embodiments, the transceiver includes a thermoelectric cooler (TEC). The thermoelectric cooler is coupled to the optical bench for thermal management of the transceiver.

The light source produces light having a continuous wavelength distribution that propagates into the channel of the waveguide, into the light source port of the waveguide coupler, and into the single output port. The light propagates from the output port to the fiber, into the waveguide coupler, and into the waveguide. The optical signal propagates through the detector port and into the detector where the optical signal is converted into the electrical signal before leaving the polymer integrated optical transceiver. In other embodiments, the light source produces light having a quasi-guassian wavelength distribution that propagates into the channel of the waveguide.

The system of optical waveguides and waveguide coupler of the transceiver includes a substrate, a lower cladding, a birefringent core, and an upper cladding. The core is coupled to the upper cladding and the lower cladding. The substrate is coupled to the lower cladding. The lower cladding has a low- or non-birefringent property. The core includes an optical channel. The lower cladding, core, and upper cladding each include an ordinary index of refraction and an extraordinary index of refraction. The lower cladding includes an extraordinary index of refraction being $ne_L$ and an ordinary index of refraction being $no_L$. The core includes an extraordinary index of refraction being $ne_C$ and an ordinary index of refraction being $no_C$. The upper cladding includes an extraordinary index of refraction being $ne_U$ and an ordinary index of refraction being $no_U$. The ordinary indices of refraction (nTE) includes $no_U < no_C > no_L$ and the extraordinary indices of refraction (nTM) includes $ne_L > ne_C > ne_U$. The polarization state of the optical mode of the transceiver is transverse electric (TE) and the extinction of undesired (TM) mode is greater than 55 dB.

The waveguide on said substrate is constructed of polymer material(s) having non-birefringent solvent resistant polymers including at least one of, but not limited to, Pyrilin 2525 and similar polyimides, and Norland 61 and similar epoxy polymer resins. The substrate is constructed of material(s) including of silicon coated with a layer of silicon nitride. The lower cladding is constructed of material(s) including at least one of, but not limited to, Pyrilin 2525 and similar polyimides. The birefringent core is constructed of material(s) including at least one of, but not limited to, Pyrilin 5878 and similar polyimides. The upper cladding is constructed of material(s) including at least one of, but not limited to, Norland 61 and similar epoxy polymer resins.

The light source includes at least one of, but not limited to, super luminescent diode(s) (SLD), a laser, and fiber source (including a laser pumped Erbium doped fiber). In embodiments, the light from the light source includes a wavelength of about 1300 nm to about 1550 nm. In other embodiments the optical bench is a unitary structure. The transceiver is utilized in an interferometric sensor.

In other embodiments the thermoelectric cooler is coupled under the optical bench for thermal management of the transceiver. In embodiments, the core of the waveguide is dimensioned and configured in the shape of a rib and the waveguide includes a planar upper and lower cladding. In other embodiments, the core of the waveguide is dimensioned and configured in the shape of a trench and the waveguide includes a planar upper and lower cladding.

The fiber pigtail is positioned between and coupled to a fiber in a sensor and a waveguide coupler. The pigtail includes at least one of, but not limited to, Polarization Maintaining (PM) optical fiber, single-mode fiber, and multimode fiber. In embodiments, the waveguides are constructed to guide a transverse magnetic (TM) single optical mode by using birefringent lower cladding, a non- (or low-) birefringent core, and a (TM) light source. In other embodiments, the waveguides are constructed to guide non-polarized light using non-birefringent core and cladding materials. The waveguides are constructed for specific wavelengths including the visible to infrared ranges.

The invention further relates to the integration and means for integrating all front-end components of an IFOG into a single transceiver module with a polymer-on-silicon and beam splitter module, replacing the LiNbO3 crystal. The polymer-on-silicon waveguides permit the hybridization of the transceiver and the mass production by semi-conductor processing equipment of the transceiver.

Figure 2:
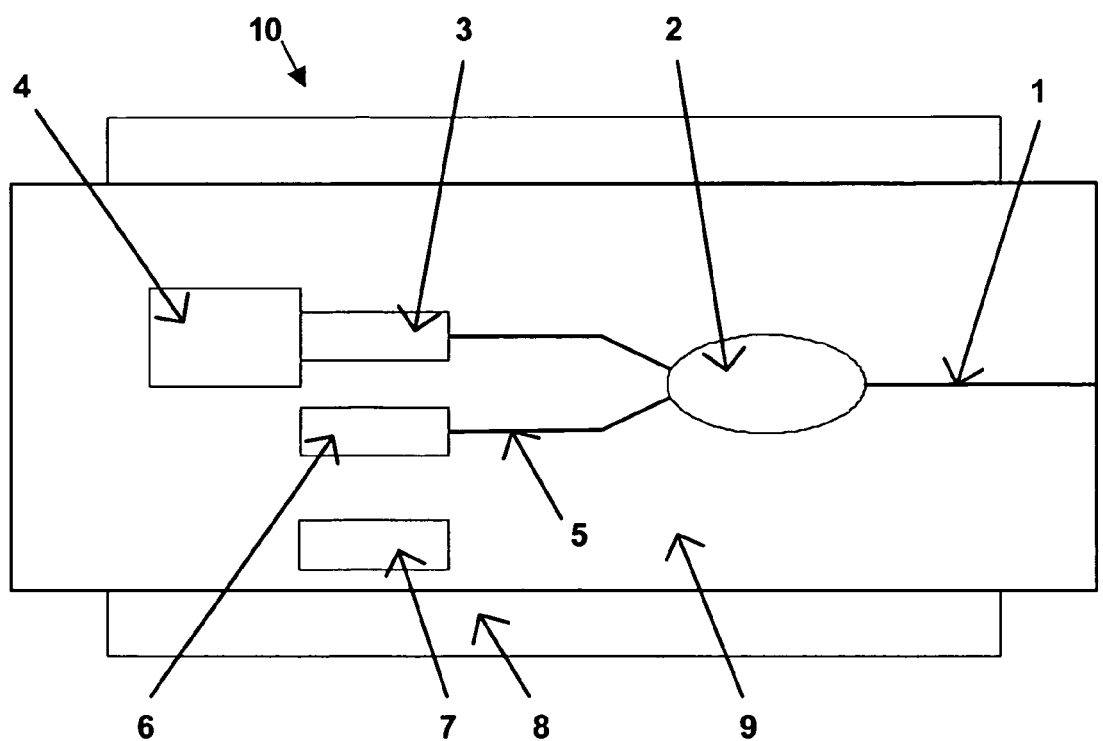
FIG. 2 shows a schematic for an integrated optical transceiver, according to embodiments of the invention.

FIG. 2 shows a schematic for an integrated optical transceiver. In embodiments, the unit is constructed of a polymer on silicon substrate 9 and includes a light source 6, a detector 3, a pre-amplifier 4, and a thermistor 7 mounted on a thermoelectric cooler (TEC) 8. The polymer on silicon substrate is termed a silicon optical bench. This designation is due to two reasons: first, the substrate is utilized as the mounting bench or optical bench for the other components to be mounted onto; and secondly, the incorporation of the optical waveguides that are patterned using a combination of different polymers includes the top layers of this bench.

In operation, a light source, including a super luminescent diode (SLD) or a fiber source (typically a laser pumped Erbium doped fiber) 6 produces light with short coherence length that is fed into one port of the waveguide coupler or Y junction 2. This type of source is what is typically used for an IFOG implementation. For other types of applications semiconductor laser sources are used. The wavelength of operation is any band or line width in the spectrum. However, a wavelength of, but not limited to about 1300 nm or about 1550 nm is desired for IFOG applications. The light from a source is coupled into the polymer waveguides 5 and propagates to the Y junction and onto the single output port 1. Signal light from the specific sensor returns back to this port and propagates to the detector element 3 where it is amplified before leaving the system.

Microfabrication technology using polymers allows the construction of the optical circuit components, i.e. the waveguides and Y branch (or power splitter) to be implemented on a single substrate. In embodiments, the substrate for this optical circuit uses the silicon wafer as a silicon optical bench or platform for all these circuit components.

After sizing the prospective discreet components, a construct is generated for the transceiver. A transceiver chip construct requires an area to mount the pre-amplifier 4, a coupler or Y branch optical waveguide 2, and other components including a SLLD source 6, a detector element 3, a thermistor 7, wire bonding pads and electrical circuit traces and grounding planes (not shown). This optical circuit chip or silicon optical bench transceiver is mounted into a metal housing package. Housed underneath the optical circuit chip in the housing is a thermoelectric cooler 8. The pinout pattern for this package is a standard 14 pin dual in line pattern for the telecom industry.

The transceiver module waveguide structure includes a substrate, a lower cladding, a core, and an upper cladding. The core is coupled to the upper cladding and the lower cladding, and the core includes an optical channel(s). The substrate is coupled to the lower cladding. The lower cladding, upper cladding, and core polymer films have an ordinary index of refraction and an extraordinary index of refraction. In the TE transceiver module waveguide the lower cladding has an extraordinary index of refraction of $ne_L$ and an ordinary index of refraction of $no_L$, the core has an extraordinary index of refraction of $ne_C$ and an ordinary index of refraction of $no_C$, the upper cladding has an extraordinary index of refraction of $ne_U$, and an ordinary index of refraction of $no_U$. The core and cladding materials have the following index profile. The extraordinary indexes of refraction are $ne_L > ne_C > ne_U$, and the ordinary indexes of refraction are $no_U < no_C > no_L$. This is accomplished by using a birefringent core material with a non- (or low-) birefringent lower cladding material. This yields a polarization state of the optical mode that is transverse-electric (TE). The extinction of the unwanted (TM) mode is greater than 55 dB.

Several complex integration issues for the transceiver are considered in the construct. Integration issues include optical crosstalk, optical isolation, mechanical stability, thermal management, and electrical crosstalk. Optical crosstalk describes the unwanted background light present on the detector. This is often suppressed with absorption materials and proper placement of components to minimize the direct path for scattering. Optical isolation techniques prevent the chip optical facets from reflecting light back at favorable angles for propagating back into waveguides. This light then manifests itself as background noise and reduces the system rotation signal dynamic range. Angle cuts and angle polishes for these coupling interfaces significantly reduce this reflected light. Mechanical stability in the placement of the components is required to maintain stable coupling of the light from one component into another. A proper choice of substrate materials and thicknesses provides the best means for maintaining stability. Thermal management is a key to preventing the source from drifting in wavelength and power. Wavelength drift manifests itself as scale factor error, phase noise, and/or intensity fluctuations at the output signal detection plane. Electrical crosstalk is typically generated from outside sources and from modulator electronics that interfere with signal integrity resulting in reduced system sensitivity.

The transceiver light source of an embodiment is either a 1.3μ or 1.5μ wavelength, broad band, vertically polarized with respect to the plane of the die, multiple quantum well die with an angle stripe geometry. This type of light source exhibits: (1) high power to overcome optical losses and maintain the required signal to noise ratio (2) the near gaussian broad band spectrum required to minimize polarization dependent bias uncertainty (3) a single mode active region for optimal coupling efficiency to the single mode polymer waveguide (4) an angle geometry that spoils back-reflection, ensuring a near gaussian spectrum.

The transceiver detector preamplifier specifications are determined by the gyro performance desired. The detector die is attached to the substrate in a similar fashion as the light source. For the TM mode, the waveguide is single mode at the wavelength of operation. For the structure to guide TM and radiate TE, the TM index of the cladding must be lower than the TM index of the core, and the TE index of the cladding must be higher than the TE index of the core. The silicon substrate index of refraction is much higher than any of the polymers and will conduct the radiated light into the substrate.

Fibers in embodiments are attached to the waveguides by optical epoxy having first been mounted in a ferule. The waveguide end faces and fiber end faces are cut at a specific angle to minimize backreflection from the interface. The fibers are rotationally aligned using a white light interferometer technique. This process is described in more detail in U.S. Pat. No. 5,422,713. This application incorporates by reference U.S. Pat. No. 5,422,713, which was issued on Jun. 6, 1995. This patent provides a method for precise rotational alignment of bi-refringent waveguide. This application incorporates by reference U.S. Pat. No. 5,321,503, which was issued on Jun. 14, 1994. This patent provides a more detailed analysis regarding interferometric fiber optic gyroscope utilizing an integrated optical chip with waveguides and couplers imbedded in it.

Embodiments include polymer materials that are of amorphous type polymers vice polycrystalline type polymers. The amorphous polymers are used to avoid light scatter off the crystallites that cause detrimental optical attenuation in the waveguide and exhibit low intrinsic optical loss. The critical factor for achieving high polarization extinction and low waveguide scattering loss from wall roughness is the index profile of the core and cladding materials.

In patent application Ser. No. 11/208,120, the invention relates to a fiber pigtail and methods of fabricating of the same. The invention relates to a method of fabricating a fiber pigtail including, providing an optical fiber having a first terminal end and second terminal end, providing a ferrule constructed of a rigid material, coupling the ferrule to the first terminal end of the fiber with a bonding means for securing the ferrule to the first terminal end, rotationally aligning the first terminal end of the fiber for polishing at an angle for proper alignment, polishing the first terminal end of the fiber utilizing the ferrule to an angle for minimizing back reflections and dimensioning and configuring the first terminal end of the fiber to be attached to a chip, and cleaning the first terminal end of the fiber. In other embodiments the method of removing the ferrule from the first terminal end of the fiber is performed and the fiber is attached to a handle and the handle/fiber is coupled to a chip. In other embodiments, the ferrule is left attached to the fiber and is then coupled to an integrated optic chip (IOC), hereafter referred to as chip.

In embodiments the bonding means includes, but not limited to, at least one of a thermal bonding compound, bonding compounds, adhesives, glues, and epoxies. The ferrule is removed, in other embodiments by reheating or with a solvent like acetone and use of an ultrasonic cleaner/hot plate, dependent on the bonding means utilized. The ferrule is constructed of materials including, but not limited to, at least one of glass (including borosilicate, soda lime), silicon, machinable ceramics, quartz, metals including steel, plastics, polymers, and kovar. An example of cleaning the first terminal end of the fiber is with acetone and isopropyl solutions in an ultrasonic cleaner.

In embodiments, the invention further comprises a handle constructed of materials including, but not limited to, at least one of glass (including borosilicate, soda lime), semiconductors, silicon, ceramics, quartz, metals including steel, plastics, polymers, and kovar. The chip is constructed of any applicable materials; however, in embodiments of the invention the chip is constructed of polymer material(s).

Another aspect of the invention relates to a method of self-alignment of a fiber to a handle including, providing a fiber pigtail having terminal end and a polished end, providing a handle having an optically flat surface and including a groove to aid in precision holding and desired optical alignment, providing a surrogate chip, providing a means for mounting, wherein the handle and the surrogate chip are placed on the mounting means for aiding in rotational parallel alignment, providing an rotationally aligning means, and aligning rotationally the fiber to the groove of the handle to position the fiber with a desired core size and using the aligning means for precise rotational alignment to desired polarization axis of the fiber with the surface of the handle.

The Norland-61 is applied to the end of the fiber. The fiber is moved back into place and the coupling is maximized and Norland-61 is cured by UV light.

Another aspect of the invention relates to a method of attachment and self-alignment of a fiber pigtail including: providing a pre-aligned fiber pigtail precisely aligned and strategically positioned within a ferrule; providing a chip having a stack and a substrate, wherein the stack includes an upper cladding, a core, and a lower cladding; etching a groove through the stack and the substrate, wherein the etched depth is dimensioned and configured to house the fiber pigtail at a predetermined height for alignment to the waveguide; aligning lithographically width with a waveguide output channel for coupling with the pre-aligned fiber pigtail; coupling and aligning the pre-aligned fiber pigtails by lateral placement and rotational orientation with the chip and adjusting the coincidence of optical reflection of the coupled chip and ferrule/fiber; and bonding edges of the coupled chip and the ferrule/fiber with a securing means for desired alignment of the fiber of the pigtail with the waveguide of the chip.

The handle is constructed of materials including, but not limited to, at least one of glass (including borosilicate, soda lime), semiconductors, silicon, ceramics, quartz, metals including steel, plastics, polymers, and kovar. In embodiments, the means for mounting includes, but is not limited to, at least one of a chuck and rotator.

Yet another aspect of the invention relates to a method of attachment and self-alignment of a fiber pigtail including, providing a pre-aligned fiber pigtail precisely aligned and strategically positioned within the groove, raising the fiber in the groove of the handle, applying a bonding means to length of the fiber, and securing the aligned fiber within the groove of the handle that ensures even distribution of the securing means, providing a chip having a stack and a substrate, wherein the stack includes an upper cladding, a core, and a lower cladding, etching a groove through the stack and the substrate, wherein the etched depth is dimensioned and configured to house the fiber pigtail at a predetermined height for alignment to the waveguide, aligning lithographically the groove width with a waveguide output channel for coupling with the pre-aligned fiber pigtail, coupling and aligning the pre-aligned fiber pigtails by lateral placement and rotational orientation with the groove of the chip and adjusting the coincidence of optical reflection of the coupled chip and handle, and bonding edges of the coupled chip and the handle with a securing means for desired alignment of the fiber of the pigtail with the waveguide of the chip.

To ensure the parallelism of the surfaces of the silicon handle with the modulator chip, reflections of a laser beam off of the two surfaces are observed on a screen at a distance of about 6-8 feet. The laser is mounted just above the sample so that the light is reflected at an angle of about 45 degrees. In embodiments, the aligning means is a white light interferometer having a continuous wavelength spectrum. In other embodiments, the aligning means is a laser.

In embodiments, the etching of a groove through a polymer stack utilizes a deep reactive ion etching system (DRIE) process. In further embodiments, the etching of a groove through a silicon substrate is with a deep reactive ion etching system (DRIE) process. The waveguide material extends beyond the groove for maintaining lateral placement of the fiber onto the chip. The handle of embodiments of the invention are constructed of materials including, but not limited to, at least one of glass (including borosilicate, soda lime), semiconductors, silicon, ceramics, quartz, metals including steel, plastics, polymers, and kovar. The bonding means includes, but is not limited to, at least one of a thermal bonding compound, bonding compounds, adhesives, glues, and epoxies. In embodiments, the chip and stack are constructed of polymer materials. The invention further includes the optic fiber pigtails fabricated by the methods described herein.

The normal fiber pigtailing process for a polymer chip used in devices such as but not limited to phase modulators and transceiver requires the precision fabrication of fiber pigtail terminal parts and a tedious active rotational alignment process. The self-alignment and attachment of the fiber process used in this embodiment eliminates these requirements and only a conventional polishing technique is required.

Pigtails and Method of Fabrication of Pigtails

Figure 3A:
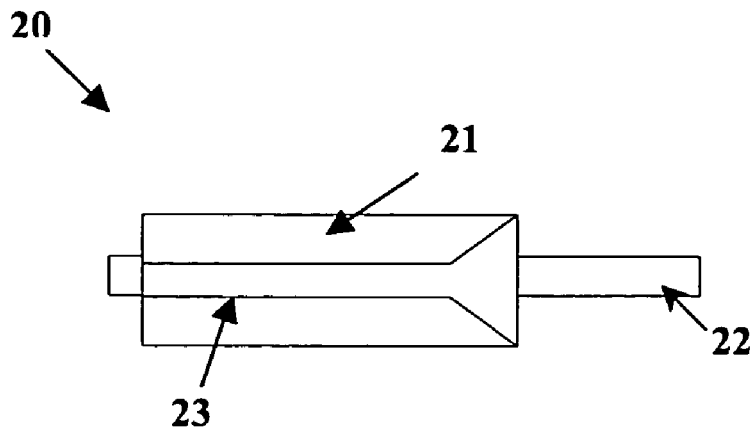
FIGS. 3A-C is a perspective view of a fiber pigtail being fabricated by angled polishing and cleaning, according to embodiments of the invention.
Figure 3B:
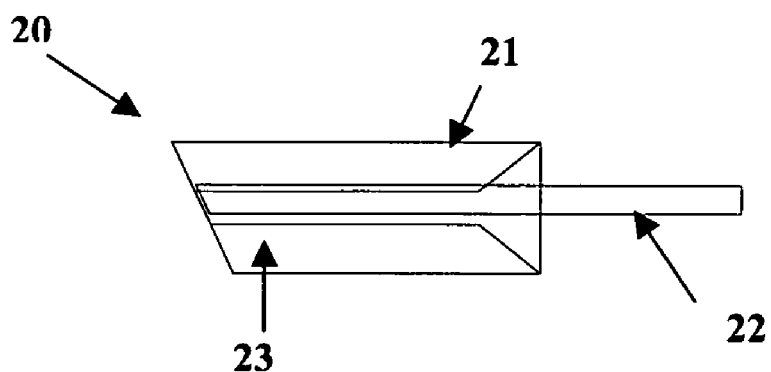
Figure 3C:

As illustrated in FIGS. 3A-C, the optical fiber is angled polished to the angle needed to minimize the back-reflections. The fiber polishing method that utilizes glass ferrule are employed. A round glass ferrule 1 is temporarily attached to the fiber 2 using a thermal bonding compound, Crystal Bond 3, which is removed by reheating or with a solvent including acetone shown in FIG. 3A. Once the ferrule is in place, the alignment and polishing process is shown in FIG. 3B. After the polishing is complete, the fiber and ferrule are placed in a beaker of acetone and put into an ultrasonic cleaner to help loosen up the crystal bond. When the crystal bond has not released by this point, a hot plate is used to loosen the rest of the crystal bond. The fiber is carefully removed from the ferrule. The fiber is then cleaned thoroughly in acetone and isopropyl in the ultrasonic cleaner. Once the fiber is polished 4, it is ready to be attached and aligned to the silicon handle as shown in FIG. 3C.

When solder is used instead of the thermal bonding adhesive, then the fiber is first coated with metal generally by means of evaporation or sputtering. The metal should be of a type that might be soldered including gold. Solder is applied to the fiber with heat to bond the fiber to a metal surface including a ferrule (if the ferrule is made of metal, for example Kovar) or other structure supporting the fiber.

Method of Self-Alignment of Optic Fiber to the Handle

Figure 4:
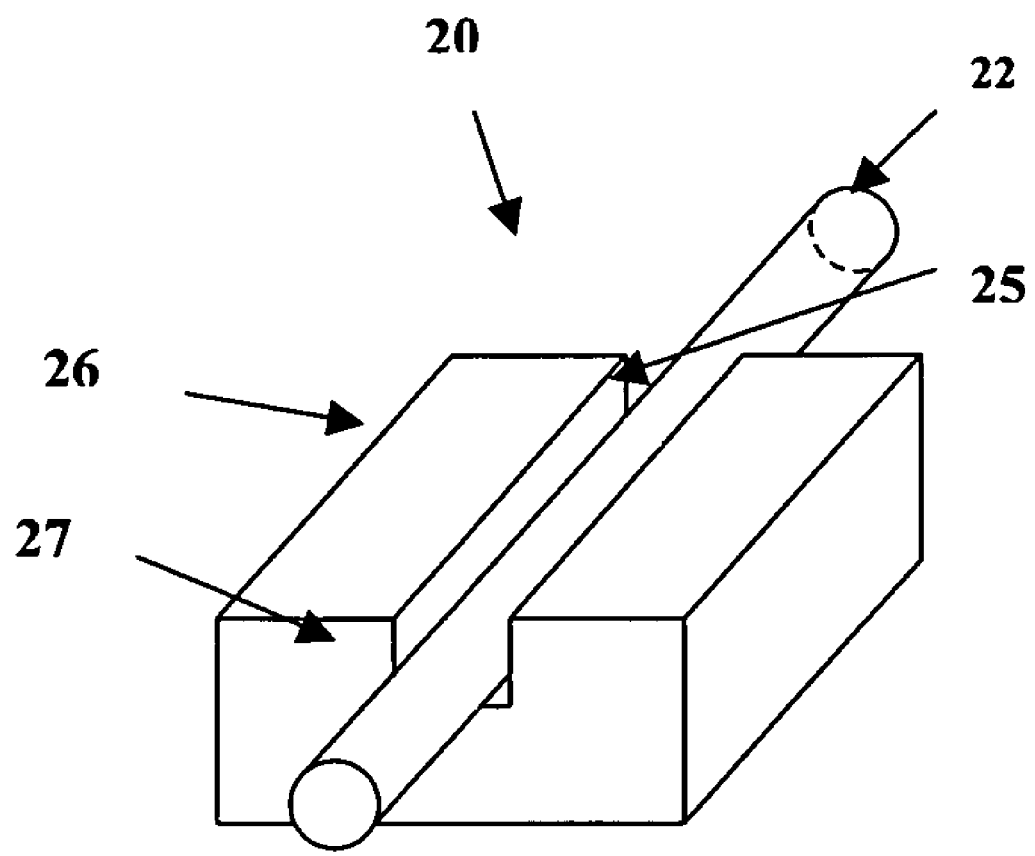
FIG. 4 is a perspective view of a groove of a silicon handle that holds or houses an optical fiber, according to embodiments of the invention.
Figure 5:
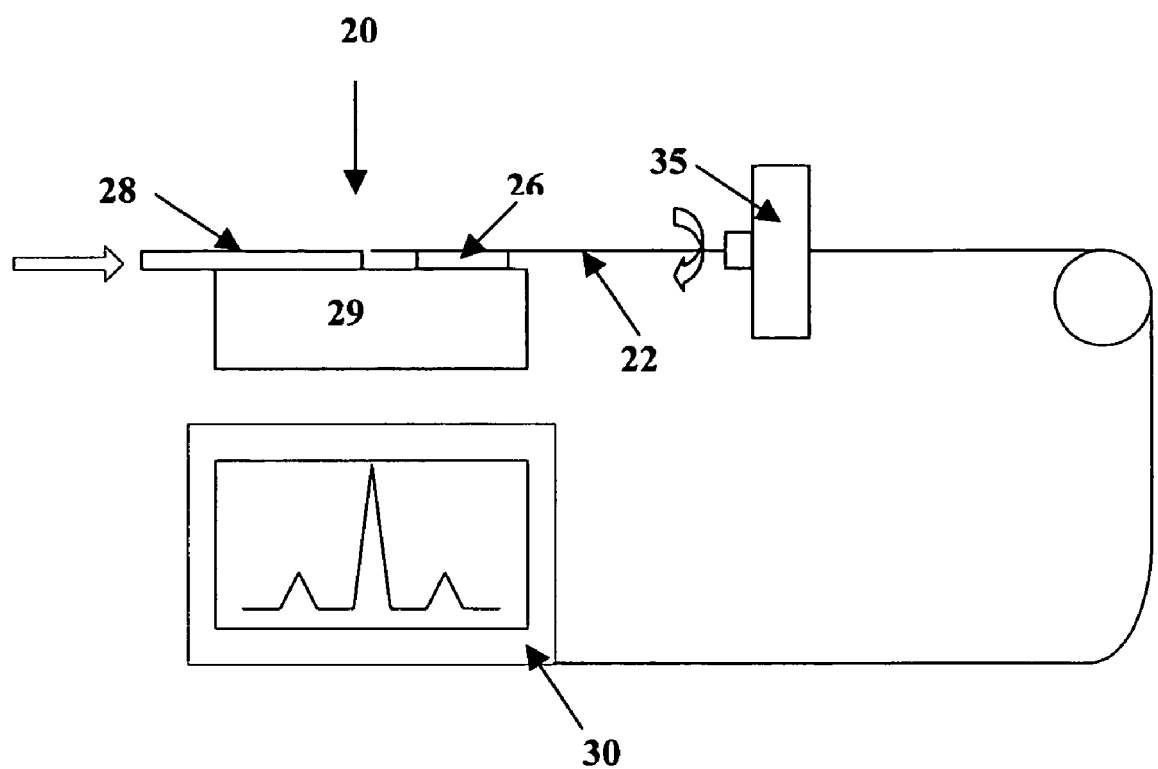
FIG. 5 illustrates a rotational alignment method of self-aligning the optic fiber to a polymer chip, according to embodiments of the invention.
Figure 6:
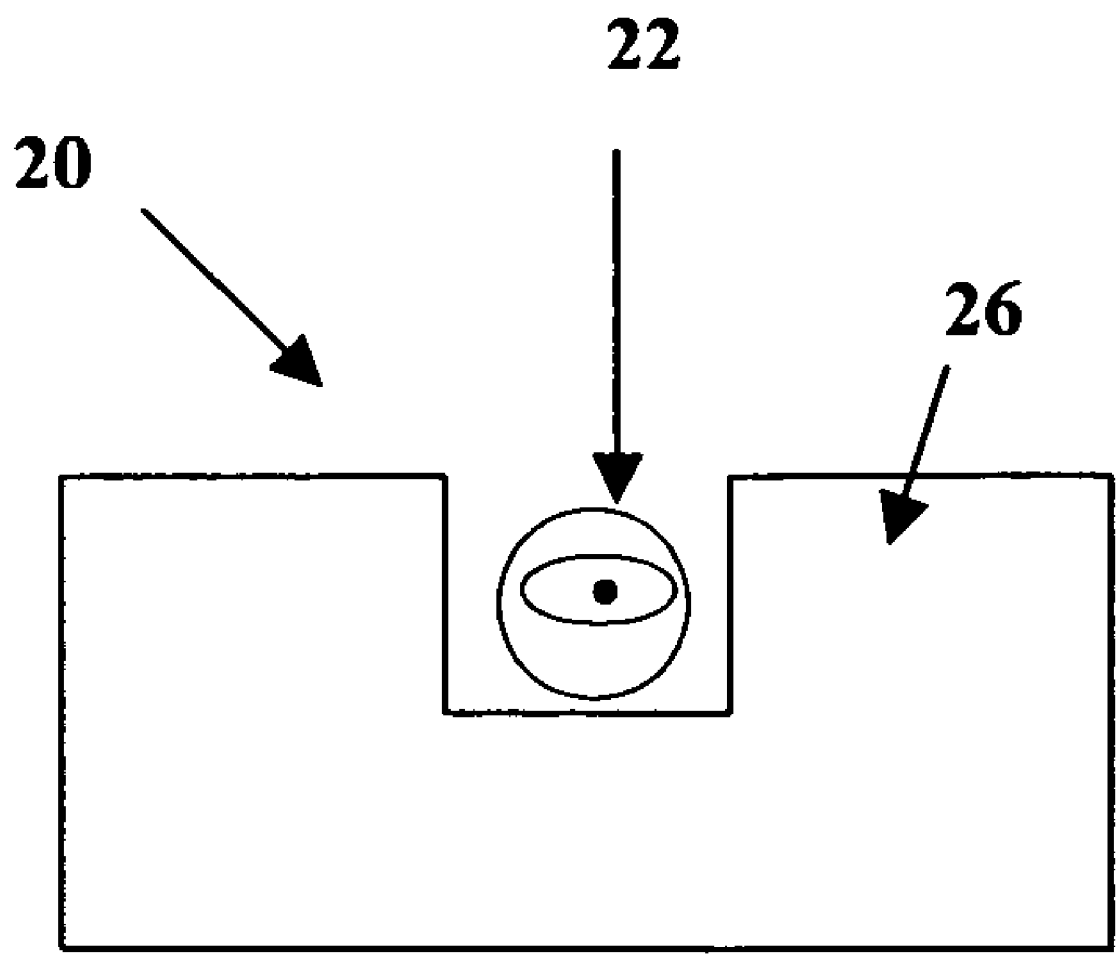
FIG. 6 illustrates when the desired polarization axis of the fiber is adequately aligned with the surface of the handle, according to embodiments of the invention.

Another aspect of the invention relates to a method of self-aligning the optic fiber 2 to a polymer chip. A grove 5 is fabricated on a 5×5×0.5 mm silicon handle 6 to position the fiber 7 with a core size of 80 micron or 125 micron as shown in FIG. 4. A polarization maintaining fiber is precision aligned rotationally to the polarization axis of the fiber using a white light Interferometer technique—(U.S. Pat. No. 5,422,713, Bi-refringent Waveguide Rotational Alignment Method Using White Light Interferometry by Michael D. Bramson). The rotational alignment is performed with the aid of a surrogate chip 8 which is placed on a common vacuum chuck 9 with the silicon handle to insure the planes of the chip and handle are parallel as shown in FIG. 5. The fiber 2 mounted on a precision fiber rotator 15 is then positioned in the groove in the handle 6 and a white light interferometer with polarizer 10 is used for rotational alignment by looking at the coherence spectrum of the output. When the alignment is complete, the desired polarization axis of the fiber is adequately aligned with the surface of the handle as shown in FIG. 6. The fiber is raised slightly to permit the epoxy to be applied along the length of the fiber and the fiber is lowered into place on the silicon handle.

Method of Attachment and Alignment of the Fiber Pigtail to the Polymer Chip

Figure 7:
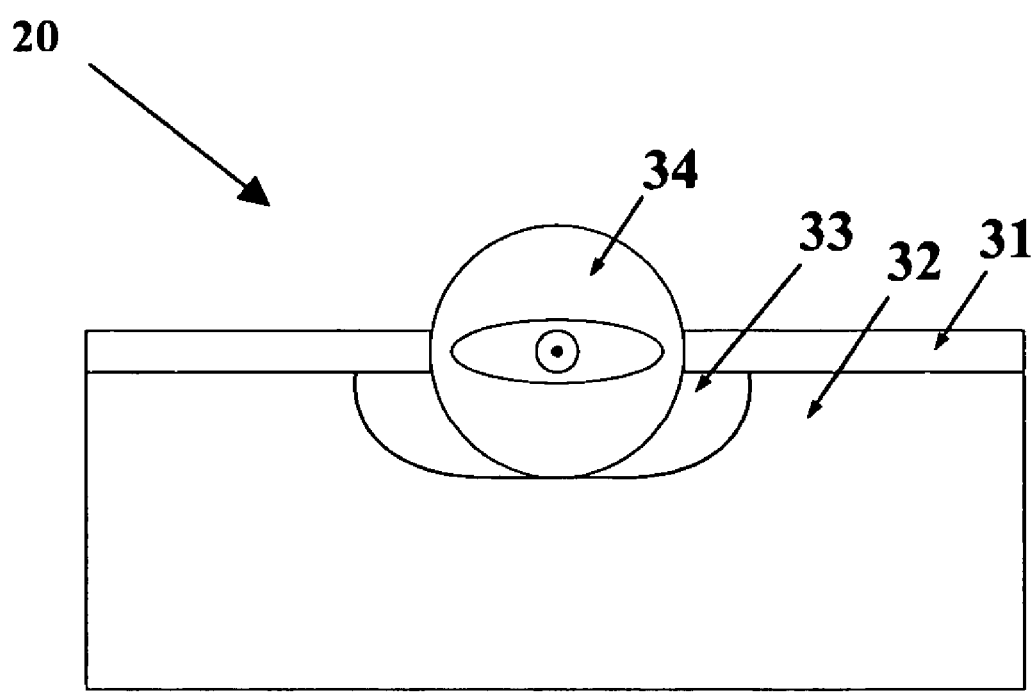
FIG. 7 is a cross-sectional view of a polymer chip having a groove etched through the polymer stack of an upper cladding, core, and lower cladding into the silicon, according to embodiments of the invention.

The polymer chip is constructed with a groove etched through the polymer stack 11 of upper cladding, core, and lower cladding, and into the silicon substrate 12 as shown in FIG. 7. The polymer groove 13 is lithographically aligned to the waveguide output channel with a groove width to provide a tight fit to the polished fiber 14 with diameter of about 80 or 125 micron. The silicon is etched with $SF_6$ using the inductively coupled plasma (ICP) deep reactive ion etching system (DRIE) process. The etch depth is constructed to hold or house the fiber (about 80 micron/125 micron) at the proper height for alignment to the waveguide also shown in FIG. 7.

Previously prepared fiber with aligned handles is registered to the polymer chip by way of the polymer alignment groves for lateral placement. To ensure parallelism of the surfaces of the silicon handle with the chip, reflections of a laser beam off of the two surfaces are observed on a screen at a distance of about 3-8 feet. The laser is mounted just above the sample so that the light is reflected at an angle of about 45 degrees. The Norland-61 is applied to the end of the fiber. The fiber is moved back into place and the coupling is maximized and Norland-61 is cured by UV-light.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An optical phase modulator, comprising:
 a plurality of non-polarizing waveguides having a layered stack including a core between at least one layer of cladding material, wherein said core is constructed of electro-optic material(s), wherein said layers of cladding materials having lower indices of refraction than said core for guided mode, wherein said layer of cladding material having higher indices of refraction than said core for non-guided mode;
a plurality of ports coupled to said waveguides;
at least one electrode coupled to at least one said waveguide including a modulating non-polarizing region;
means for applying an external electrical field to each said electrode;
a light that propagates into each said waveguide;
at least one coupler/splitter for coupling and splitting said light into a plurality of said waveguides;
a substrate dimensioned and configured to integrate a plurality of optical components, wherein said optical components include a plurality of said non-polarizing waveguide(s), a waveguide having a non-polarizing non-modulating region and a non-polarizing modulating region, said coupler/splitter(s), and said electrode (s);
a waveguide configuration including said first non-polarizing waveguide, wherein said first waveguide is coupled to said coupler/splitter, wherein said coupler/splitter including a plurality of splitter ports, wherein each said splitter ports are coupled to a second polarizing waveguide and third non-polarizing waveguide, wherein at least one of said second waveguide or said third waveguide includes a non-polarizing modulating region, wherein said second waveguide and said third waveguide each include a said port; and
at least two optical fiber pigtails, wherein each end of said second waveguide and said third waveguides are coupled to said optical fiber pigtails.

2. The modulator according to claim 1, wherein said cladding materials are constructed of a plurality of polymer materials.

3. The modulator according to claim 1, wherein said means for applying an external electrical field include at least one of a voltage- or signal-generating device.

4. The modulator according to claim 1, wherein said electrode is constructed of semi-conductive materials.

5. The modulator according to claim 1, wherein said electrode is constructed of conductive materials including at least one of metals, metal alloys, sulfides, polymers, and oxides.

6. The modulator according to claim 1, wherein said substrate is constructed of silicon and/or silicon nitride.

7. The modulator according to claim 1, wherein said stack includes at least a three layer stack comprising of a core between at least two polymer cladding layers.

8. The modulator according to claim 1, wherein said modulator includes a polymeric transverse magnetic (TM) non-degenerate single optical mode region for use in a fiber optic gyroscope.

9. The modulator according to claim 8, wherein said layers of cladding materials include a lower cladding and an upper cladding, wherein said lower cladding, said upper cladding and said core each having an ordinary index of refraction and an extraordinary index of refraction, wherein said lower cladding having an extraordinary index of refraction being $ne_L$ and an ordinary index of refraction being $no_L$, wherein said core having an extraordinary index of refraction being $ne_C$ and an ordinary index of refraction being $no_C$, wherein said upper cladding having an extraordinary index of refraction being $ne_U$ and an ordinary index of refraction being $no_U$, wherein said ordinary indices of refraction include $no_U < no_C < no_L$ and said extraordinary indices of refraction include $ne_L < ne_C > ne_U$.

10. The modulator according to claim 1, wherein said modulator includes a polymeric transverse electric (TE) non-degenerate single optical mode region for use in a fiber optic gyroscope.

11. The modulator according to claim 10, wherein said layers of cladding materials include a lower cladding and an upper cladding, wherein said lower cladding, said upper cladding, and said core each having an ordinary index of refraction and an extraordinary index of refraction, wherein said lower cladding having an extraordinary index of refraction being $ne_L$ and an ordinary index of refraction being $no_L$, wherein said core having an extraordinary index of refraction being $ne_C$ and an ordinary index of refraction being $no_C$, wherein said upper cladding having an extraordinary index of refraction being $ne_U$ and an ordinary index of refraction being $no_U$, wherein said ordinary indices of refraction include $no_U < no_C > no_L$ and said extraordinary indices of refraction include $ne_L > ne_C > ne_U$.

12. The modulator according to claim 1, wherein said waveguides are configured in a co-linear construction.

13. The modulator according to claim 1, wherein said core is constructed of materials comprising at least one of electro-optic polymer.

14. The modulator according to claim 1, wherein said cladding materials are constructed of materials comprising at least one of NOA-71 and NOA-61.

15. The modulator according to claim 1, wherein said modulating region of said waveguide includes a lower cladding layer being constructed of substantially non-birefringent materials.

16. The modulator according to claim 1, wherein said non-modulating region of said waveguide includes a lower cladding layer being constructed of birefringent materials.

17. The modulator according to claim 1, wherein said light includes a continuous wavelength distribution that propagates into said waveguide.

* * * * *